United States Patent [19]
Church

[11] 3,743,871
[45] July 3, 1973

[54] DYNAMOELECTRIC MACHINE LUBRICANT STORAGE ARRANGEMENT

[75] Inventor: Ralph E. Church, Fort Wayne, Ind.

[73] Assignee: General Electric Company, Fort Wayne, Ind.

[22] Filed: Feb. 16, 1972

[21] Appl. No.: 226,923

[52] U.S. Cl. .............................. 310/90, 308/127
[51] Int. Cl. ....................................... H02k 5/16
[58] Field of Search .............. 310/90, 89, 91, 42, 310/172; 308/132, 240, 127

[56] References Cited
UNITED STATES PATENTS

| | | |
|---|---|---|
| 3,500,087 | 3/1970 | Wendt .................. 310/90 |
| 3,250,579 | 5/1966 | Tupper .................. 308/127 |
| 3,361,496 | 1/1968 | Cunningham ........... 308/132 |
| 3,420,335 | 1/1969 | Dochterman ............ 310/90 |
| 3,515,918 | 6/1970 | Otto ..................... 310/90 |

Primary Examiner—R. Skudy
Attorney—Joseph B. Forman, John M. Stoudt et al.

[57] ABSTRACT

A dynamoelectric machine is disclosed comprising a stator, a shaft having a rotor fixed thereto, and a bearing supporting the rotor shaft for rotation with respect to the stator. A lubricant retaining reservoir is mounted in spaced relation laterally about the bearing. A lubricant absorbent mass is mounted within the lubricant retaining reservoir flush with the bearing from which mass lubricant may be supplied to the bearing. A grooved surface is disposed within the reservoir to receive excess lubricant from lubricant saturated portions of the mass in contact with the grooved surface and from which excess lubricant may be resupplied to portions of the mass in contact with the grooved surface when such portions are unsaturated with lubricant.

12 Claims, 4 Drawing Figures

Patented July 3, 1973
3,743,871
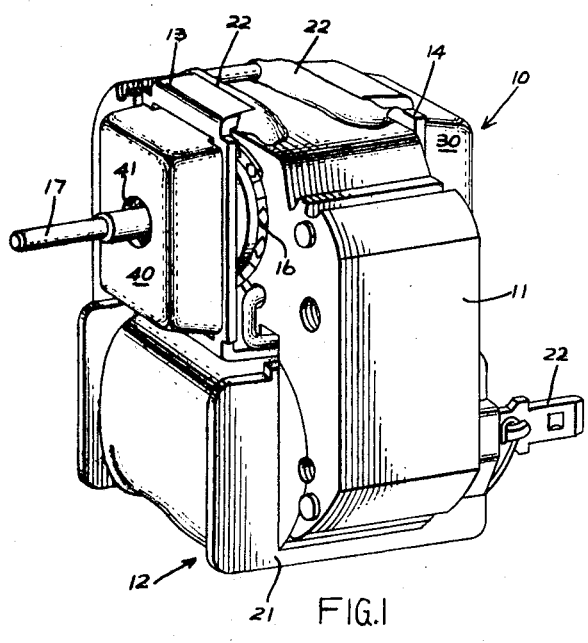
FIG.1
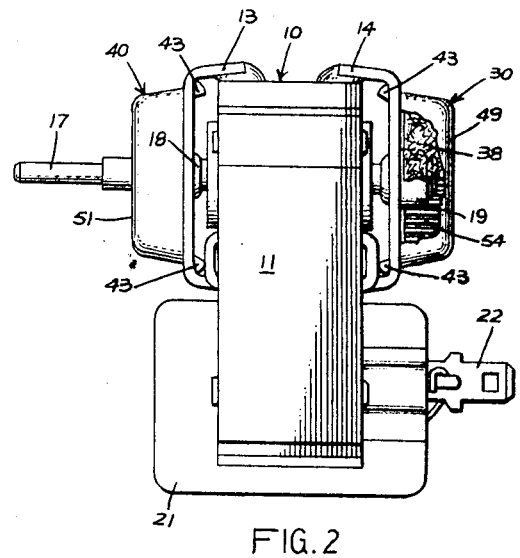
FIG.2
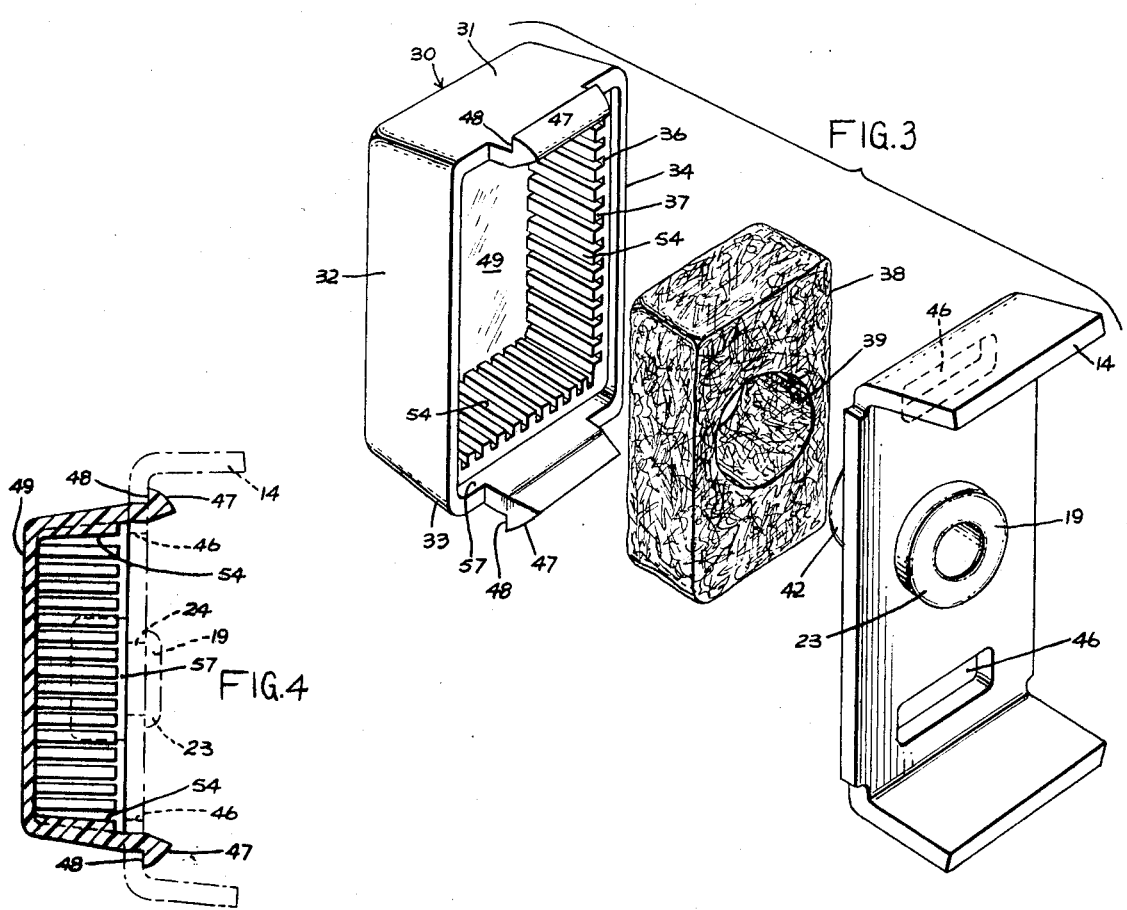
FIG.3
FIG.4

DYNAMOELECTRIC MACHINE LUBRICANT STORAGE ARRANGEMENT

BACKGROUND OF THE INVENTION

The present invention relates generally to dynamoelectric machines and more particularly to lubricant storage arrangements that may be used to particular advantage in electric motor lubrication systems.

There are many applications of small electric motors that, desirably, include low cost, yet reliable means for lubricating bearing means that support a rotor for movement relative to a stator. For example many domestic refrigerators utilize small motors for driving air circulating fans. These small motors often are mounted in relatively inaccessible locations where it would be difficult or inconvenient to add lubricant to the lubricant retaining means, such as lubricant reservoirs, that normally are used with these motors. Moreover, the space available for these motors in many cases may limit the physical size of the motor. This in turn would generally limit the size of the lubricant reservoir of the motor, and particularly when the motor is of the so-called "skeleton" type. Motors of this general type are illustrated, e.g., in M. D. Tupper U.S. Pats. Nos. 3,024,377 and 3,250,932 which issued on Mar. 6, 1962 and May 10, 1966 respectively. Both of these Tupper patents are assigned to the assignee of this application.

Because of the above described and other problems, it has become increasingly important to provide bearing lubrication systems that include lubricant reservoirs of sufficient capacity to provide a supply of lubricant that will last for the period of time that the motor is expected to be used. For these and other reasons, it is preferable to provide means for conserving the lubricant in the lubrication system. These means may include arrangements of the type described, e.g., in Tupper U.S. Pat. No. 3,264,045 (dated Aug. 2, 1966) or in Cunningham U.S. Pat. No. 3,361,496 (dated Jan. 2, 1968), both of which patents also are assigned to the assignee of the present application.

It will be understood that many of the approaches utilized heretofore have used a plurality of parts in order to provide a closed or sealed lubrication system that would be reliable to use in actual practice. Moreover, a need has long been recognized for efficient low cost lubrication systems and arrangements for mounting the same. These needs, in addition to others, are described for example in Tupper et al. U.S. Pat. No. 2,959,696 (dated Nov. 8, 1960) and Tupper U.S. Pat. No. 3,145,313 (dated Aug. 18, 1964). These patents teach, inter alia, means for avoiding or reducing lubricant loss due to expansion of the lubricant upon heating. Other patents, e.g., Baclawski U.S. Pat. No. 3,168,663, dated Feb. 2, 1965, illustrate the use of oil seals for lubricant conservation purposes. More recently, i.e., Mar. 10, 1970, U.S. Pat. No. 3,500,087 issued to M. E. Wendt which discloses approaches that may be followed to, among other things, eliminate the need for threaded fasteners. The above mentioned, Tupper, Tupper et al., Baclawski, and Wendt patents all are assigned to the assignee of the present application.

When the just described as well as other approaches are followed, it also normally is desirable to provide structural arrangements wherein the different parts thereof have a desired degree of structural rigidity and integrity. Accordingly, it would be desirable to provide new and improved arrangements whereby lubricant reservoir members are provided having one or more of the desirable attributes of: sufficient strength and rigidity to prevent rupture or deformation thereof and resultant lubricant loss; configurations that result in lubricant conservation without requiring the use of gaskets or other sealing members; means for temporarily storing lubricant when the volume thereof is increased, e.g., due to thermal expansion, and for returning the temporarily stored lubricant to other lubricant storage or feeding means as the lubricant cools and contracts; and being inexpensive to manufacture and assemble with other motor parts, e.g., by being arranged as a cup shaped member open on one side and being readily snapped together with a supporting member.

Accordingly, it is an object of the present invention to provide a new and improved dynamoelectric machine lubrication system.

It is another object of the present invention to provide a new and improved dynamoelectric machine lubricant reservoir having one or more of the aforementioned desirable attributes.

More specifically, it is an object of the present invention to provide a dynamoelectric machine lubricant reservoir arrangement having means for temporarily storing excess lubricant upon expansion of the lubricant and for returning such excess lubricant to a lubricant retainer and/or feeder upon cooling.

Another object of the present invention is to provide a low cost lubricant reservoir cover, open on one side, that is reinforced by internal ribs and that may be readily latched to a dynamoelectric machine bearing support or end frame.

SUMMARY OF THE INVENTION

In carrying out the above and other objects in one form, I provide a lubrication system for use with dynamoelectric machines that include a stator, a rotor assembly, and a bearing supporting the rotor assembly for rotation with respect to the stator. The lubrication system includes lubricant retaining and feeding means in the form of a pad or wick that supplies lubricant to the bearing. A lubricant reservoir defining member or cover is also provided and this member includes means, in the form of capillary means that temporarily store lubricant driven from the wick as a result of a thermally caused increase in lubricant volume. In a preferred form, the capillary means are in the form of ribs and grooves, and the ribs also increase the structural rigidity of the cover. As the lubricant cools and contracts, it is resupplied to the wick from the capillary means. In the illustrated embodiment, the cover is open on one side and is mounted adjacent to an end frame bearing support, or other portion of a dynamoelectric machine stator assembly. The end frame then closes the cover. Gaskets or other sealing means need not be provided between the cover and end frame although a lubricant barrier gap is preferably provided around the open periphery of the cover. In the preferred illustrated form, the cover includes latch means in the form of a pair of hook projections extending from sidewalls thereof that may be used to quickly and conveniently mount the cover to a motor end frame or other structure. For this purpose, the end frame or other structure is then provided with latch or hook projection accommodating regions with which the hook projections cooperate to hold the cover in assembled relationship with the stator.

The subject matter which I regard as my invention is particularly pointed out and distinctly claimed in the concluding portion of this specification. My invention itself, however, both as to its organization and method of operation, together with further objects and advantages thereof may best be understood by reference to the following description taken in connection with the accompanying drawing.

BRIEF DESCRIPTION OF THE DRAWING

FIG. 1 is a perspective view of a dynamoelectric machine in the form of an electric motor which embodies the present invention in one form;

FIG. 2 is a side elevation, with parts removed and parts broken away, of the motor of FIG. 1;

FIG. 3 is a partially exploded, perspective view of part of the structure of FIG. 1; and FIG. 4 is a side elevation, with parts removed, in section, or shown in phantom, of a portion of the structure revealed in FIGS. 1, 2, and 3.

DESCRIPTION OF THE PREFERRED EMBODIMENT

Referring now in more detail to the drawing there is shown in FIG. 1 an electric motor 10 of the shaded pole type embodying one form of the present invention. The motor includes a stator assembly comprising a stator core 11, winding means 12, and a pair of end frames 13, 14. A rotor assembly includes a conventional rotor body or core 15 and shaft 17. The shaft is supported by bearing means, such as sleeve bearings 18, 19 that are supported by the end frames. The rotor core 15 includes a short circuited squirrel cage winding and rotates as a result of energization of a wound coil which is wound about an insulating coil support 21. Additional details of arrangements of this type are set forth in my co-pending and commonly assigned application, Ser. No. 99,049, filed Dec. 17, 1970 and the disclosure of that application is incorporated herein by reference. The winding of the motor 10 may be connected to a suitable source of energization current by means of terminals 22, as will be understood. The end frames 13, 14 may be secured to the stator core by any suitable means and the use of a structural adhesive 22 material, as described in Tupper U.S. Pat. No. 3,024,377 has been used for this purpose.

The bearings 18, 19 preferably comprise relatively porous, sintered material sleeve bearings each with one end 23 of reduced diameter (see FIGS. 3, 4) positioned within a bearing receiving hole 24 of the end frames. The end frames comprise U-shaped brackets formed of structural material, e.g., light weight aluminum. Preferably, the ends 23 of the sleeve bearings are staked or swedged to the end frames in the area of holes 24. The positioning of the end frames is preferably such that the bearings are aligned so that a concentric and uniform air gap is established between the rotor and stator, as will be understood.

The bearing lubrication system, as illustrated, includes a plastic cup-shaped reservoir cover 30. The interior surfaces of the side walls 31-34 of the cover have a number of mutually spaced, parallel grooves and ribs 36, 37. The grooves are sufficiently small, e.g., in the order of 0.06 of an inch or less, to establish capillary means for lubricant, e.g. oil, employed for lubricating the bearings 18, 19. Lubricant absorbent means, such as pads 38 of wool felt or other suitable material has a centrally located aperture 39 therein and is mounted in a lubricant saturated condition within each of the cup-shaped covers 30 and 40. The covers 30 and 40 are substantially identical, as will be understood, although a shaft accommodating opening 41 is provided in cover 40. The covers 30, 40 and pads may be mounted about bearings 18, 19 with the pads disposed snugly about the longitudinal peripheries of the bearings, e.g. periphery 42 of bearing 19. Mounting may be accomplished manually by pressing the covers against the end frames to cause latching means shown as hook like projections 43 to be accommodated by regions of the end frames. These regions may be slots such as those shown at 46. With the illustrated arrangement, as the projections pass through the slots they are flexed slightly towards one another by the force of their camming surfaces 47 being pressed against the edges of the slots. As the projections progress through the slots, retaining means, such as lips 48 will latch against the end frames. A more detailed description of arrangements of this type is presented in the aforementioned Wendt U.S. Pat. No. 3,500,087 and the entire disclosure of that patent is incorporated herein by reference.

During motor operation lubricant is supplied to the bearing interface between shaft 17 and bearings 18, 19 from lubricant feeding pads 38. Lubricant flows from the pads directly onto the longitudinal periphery of the bearings and thence to the bearing bores. However, as the temperature of the motor 10 becomes elevated, e.g., during operation, the volume of lubricant will increase. The illustrated arrangement conserves this lubricant however, and the lubricant enters the grooves 36 and is temporarily stored therein. Then, upon cooling of the motor 10, the stored excess lubricant is fed by capillary action back to the pads 38 which have a higher degree of capillarity than the grooves 52. In this manner lubricant is conserved which otherwise might be lost from the reservoir. The grooves 52 decrease in size from a maximum size adjacent the open face of the covers toward the faces 49, 51 thereof. In one exemplification, an E. I. du Pont de Nemours Company material known as ZYTEL 101 nylon was used to fabricate the covers 30, 40. The width of grooves 36 was approximately uniform along the length thereof and was about 0.015 of an inch. The length of each groove in the same exemplification was about 0.33 of an inch, whereas the depth of the grooves was about 0.033 of an inch at its extremity adjacent to the open face of each of the covers. The bottom of each groove 36 had a taper of about 2°, and the surface 54 of each rib had a taper of about 1°, as best viewed in FIG. 4. The taper for each was toward the rear walls 49, 51 of the covers and thus the capillary grooves 36 diminished in size toward the closed ends 49, 51 of the covers. Therefore, as will be understood, lubricant in the grooves 36 would tend to flow toward the smaller ends thereof as well as into the pads 38.

It will be observed from the exemplified structure that gaskets or other means for sealing the covers 30, 40 to the frames 13, 14 have not been used. I have found that lubricant, e.g. oil, will be conserved within the reservoirs of covers 30, 40 without such seals. It is advantageous, however, to provide barrier means that inhibit the flow of lubricant away from the covers by capillary action. In the preferred forms, such means are embodied as barrier grooves 57. These grooves are sufficiently large that the ends of capillary grooves 37 are positioned 0.006 of an inch or more from the faces of the end frames so that oil will not flow thereacross by capillary action.

It will be realized by those skilled in the art that benefits to be derived from use of the present invention are applicable to motors other than the type illustrated herein and that various changes may be made without departing from the spirit and scope of the invention.

Accordingly, while in accordance with the Patent Statutes, I have described what at present is considered to be the preferred embodiment of my invention, it will be obvious to those skilled in the art that numerous other changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. A dynamoelectric machine comprising a stator core, a rotor assembly including a shaft, a lubricant reservoir cover supporting member, a lubricant reservoir cover defining a reservoir for a supply of lubricant with the cover being assembled with the reservoir cover supporting member, and a supply of lubricant stored within said reservoir cover; said reservoir cover having the interior thereof in open communication with said supporting member; and said reservoir cover comprising a housing having wall means with terminal portions thereof disposed adjacent to said supporting member, and further comprising capillary means for accommodating lubricant as the lubricant becomes heated and expands and for releasing lubricant as the lubricant cools and contracts.

2. The dynamoelectric machine of claim 1 wherein said supporting member includes at least two predetermined regions for accommodating hook projection means and said reservoir cover includes at least two hook projection means accommodated along said predetermined regions whereby said reservoir cover and said supporting member may be readily assembled one with another.

3. The dynamoelectric machine of claim 1 wherein a lubricant storage member is disposed within said reservoir cover, said means for conserving lubricant comprising a plurality of capillary passages in proximity with said lubricant storage means, and said wall means defining a lubricant barrier groove adjacent to said supporting member thereby to prevent the flow of lubricant from the capillary passages to the supporting member.

4. In a dynamoelectric machine having a frame supporting a bearing, means for supplying a lubricant to said bearing, and a housing defining a lubricant reservoir; said housing comprising wall means having the extremity portions thereof adjacent to said frame with the interior of the housing member in open communication with said frame; lubricant retaining means within said housing member; said wall means defining a barrier groove for preventing the flow of lubricant along said wall means and onto said frame; and means for fastening the housing and frame together whereby the frame and housing may be assembled together and lubricant retaining in the housing without a separate lubricant sealing member.

5. The structure of claim 4 wherein said means for fastening includes hook projection means and said frame includes predetermined regions for accommodating the hook projection means.

6. The structure of claim 4 wherein the lubricant retaining means comprise a plurality of capillary passages disposed in the interior side walls of the housing.

7. A dynamoelectric machine comprising a stator; a rotor shaft; a frame member carrying at least one bearing for supporting said rotor shaft for rotation with respect to said stator; a lubricant retaining reservoir member; means for latching said lubricant retaining reservoir member to said frame member in spaced relation about said bearing with the interior of the reservoir member in open communication with said frame member; at least one grooved surface disposed within said lubricant retaining reservoir facing said bearing; and a lubricant absorbent mass disposed within the interior of said lubricant retaining reservoir member in intimate contact with at least said bearing, said lubricant absorbent mass also being in contact with the grooved surface within the lubricant retaining reservoir.

8. The dynamoelectric machine of claim 7 wherein the lubricant retaining reservoir member is generally rectangular in shape, and the at least one grooved surface defines a plurality of tapered capillary passageways.

9. The dynamoelectric machine of claim 8 wherein the reservoir member includes at least four side walls and each of said side walls has a plurality of generally parallel capillary passageways formed therealong.

10. A dynamoelectric machine comprising a stator core, a rotor assembly including a shaft, a lubricant reservoir cover supporting member, a lubricant reservoir cover assembled with the reservoir cover supporting member, and lubricant within said reservoir cover; said reservoir cover comprising a housing having wall means with terminal portions thereof disposed adjacent to said supporting member and further comprising means for accommodating a volume of lubricant as the lubricant becomes heated and expands and releasing lubricant as the lubricant cools and contracts; said supporting member including at least two predetermined regions for accommodating hook projection means and said reservoir cover including at least two hook projection means accommodated along said predetermined regions, said hook projection means and predetermined regions co-acting with one another to hold said reservoir cover and said supporting member in assembled relation.

11. The dynamoelectric machine of claim 10 wherein a lubricant storage member is disposed within said reservoir cover, said means for conserving lubricant comprising a plurality of tapered capillary passages in proximity with said lubricant storage means, and said wall means defining a lubricant barrier groove adjacent to said supporting member thereby to prevent the flow of lubricant from the capillary passages to the supporting member.

12. The dynamoelectric machine of claim 11 wherein said predetermined regions are at least two slots formed in the supporting member.

* * * * *